United States Patent
Giamatti (10) Patent No.: US 9,409,526 B2
(45) Date of Patent: Aug. 9, 2016

(54) CARGO CARRIER SYSTEMS FOR PASSENGER TRUCKS

(71) Applicant: Nicholas Joseph Giamatti, Big Pin Key, FL (US)

(72) Inventor: Nicholas Joseph Giamatti, Big Pin Key, FL (US)

( * ) Notice: Subject to any disclaimer, the term of this patent is extended or adjusted under 35 U.S.C. 154(b) by 9 days.

(21) Appl. No.: 14/539,954

(22) Filed: Nov. 12, 2014

(65) Prior Publication Data

US 2015/0132090 A1    May 14, 2015

Related U.S. Application Data

(60) Provisional application No. 61/903,368, filed on Nov. 12, 2013.

(51) Int. Cl.
| | |
|---|---|
| *B60P 3/00* | (2006.01) |
| *B60R 9/042* | (2006.01) |
| *B60P 1/02* | (2006.01) |

(52) U.S. Cl.
CPC .. *B60R 9/042* (2013.01); *B60P 1/02* (2013.01)

(58) Field of Classification Search
CPC .................................. B60R 9/042; B60P 1/02
See application file for complete search history.

(56) References Cited

U.S. PATENT DOCUMENTS

| | | | |
|---|---|---|---|
| 2,741,383 A | 4/1956 | Leckert | |
| 4,854,628 A | 8/1989 | Halberg | |
| 4,953,757 A | 9/1990 | Stevens et al. | |
| 5,281,075 A | 1/1994 | Tatman et al. | |
| 5,586,856 A | 12/1996 | Springer | |
| 5,609,462 A | 3/1997 | Reimer | |
| 5,628,540 A | 5/1997 | James | |
| 5,868,453 A * | 2/1999 | Steigner | B60P 3/40 296/100.1 |
| 5,924,835 A | 7/1999 | Ross | |
| 6,099,232 A | 8/2000 | Dixon et al. | |
| 6,637,793 B2 * | 10/2003 | Krause | B60R 9/00 224/403 |
| 6,644,704 B1 | 11/2003 | Nyberg | |
| 6,666,490 B1 | 12/2003 | Thacker | |
| 6,676,220 B2 | 1/2004 | Mistler | |
| 7,631,916 B1 * | 12/2009 | Coleman | B60P 3/40 296/3 |
| 7,758,091 B1 | 7/2010 | McCall | |
| 7,780,050 B2 | 8/2010 | Tucker | |
| 7,997,850 B2 | 8/2011 | Hutchison | |
| 8,113,562 B2 | 2/2012 | Skoglun | |
| 2004/0161322 A1 | 8/2004 | Brachman et al. | |
| 2006/0182544 A1 | 8/2006 | Hurst | |
| 2007/0258800 A1 | 11/2007 | Mistler | |
| 2008/0079277 A1 | 4/2008 | Wethington | |
| 2011/0127790 A1 | 6/2011 | Mokhtari | |
| 2011/0202199 A1 | 8/2011 | Crane | |
| 2012/0263561 A1 | 10/2012 | Li | |
| 2013/0062378 A1 | 3/2013 | Hobbs | |

* cited by examiner

*Primary Examiner* — Lori L Lyjak (57) ABSTRACT

Disclosed is a system to assist hauling and loading of cargo above a passenger truck. The system has a forward frame and a rearward frame that are pivotally attached to the cargo area of the passenger truck. The frames tilt between an upright stowage position and a downward loading position. The frames are connected by a mechanical-advantage member to tilt the rearward frame faster than the forward frame when moving between the loading and stowage positions. Additionally, a spring, piston or other force facilitator device can be used to gain further mechanical advantage.

25 Claims, 8 Drawing Sheets

CARGO CARRIER SYSTEMS FOR PASSENGER TRUCKS

CROSS REFERENCE TO RELATED APPLICATIONS

The present application is related to prior provisional application Ser. No. 61/903,368 filed Nov. 12, 2013 the contents of which are incorporated herein by this reference and are not admitted to be prior art with respect to the present invention by the mention in this cross-reference section.

BACKGROUND

Applicant is not aware of any cargo carrier capable of loading cargo above a passenger truck that provides the mechanical advantages described herein.

OBJECTS AND FEATURES

A primary object and feature of the present invention is to assist the loading and hauling of cargo above passenger trucks while not interfering with the use of the truck bed (cargo area) of the passenger truck.

It is a further object and feature of the present invention to provide for lowering the lift height to near the height of the passenger truck's floor level or tailgate hinge level.

It is another object and feature of the present invention to provide for significant reduction in manual force to move the cargo carrier between the loading and stowage positions.

It is a yet a further object and feature of the present invention to provide for a retaining roller to hold the cargo in place during strapping, bungeeing, or otherwise securing the cargo to the carrier.

It is a further object and feature of the present invention to provide for installation with tool boxes mounted in the passenger truck bed.

It is a another object and feature of the present invention to provide for rolling cargo onto the carrier to avoid touching the passenger cabin or other parts of the passenger truck.

Another primary object and feature of the present invention is to provide such a system that is safe, efficient, trustworthy, inexpensive and handy. Other objects and features of the present invention will become apparent with reference to the following descriptions.

SUMMARY

Disclosed is a system to assist hauling and loading of cargo above a passenger truck. The system has a forward frame and a rearward frame that are pivotally attached to the cargo area of the passenger truck. The frames tilt between an upright stowage position and a downward loading position. The frames are connected by a mechanical-advantage member to tilt the rearward frame faster than the forward frame when moving between the loading and stowage positions. Additionally, a spring, piston or other force facilitator device can be used to gain further mechanical advantage.

DETAILED DESCRIPTION

Figure 1:
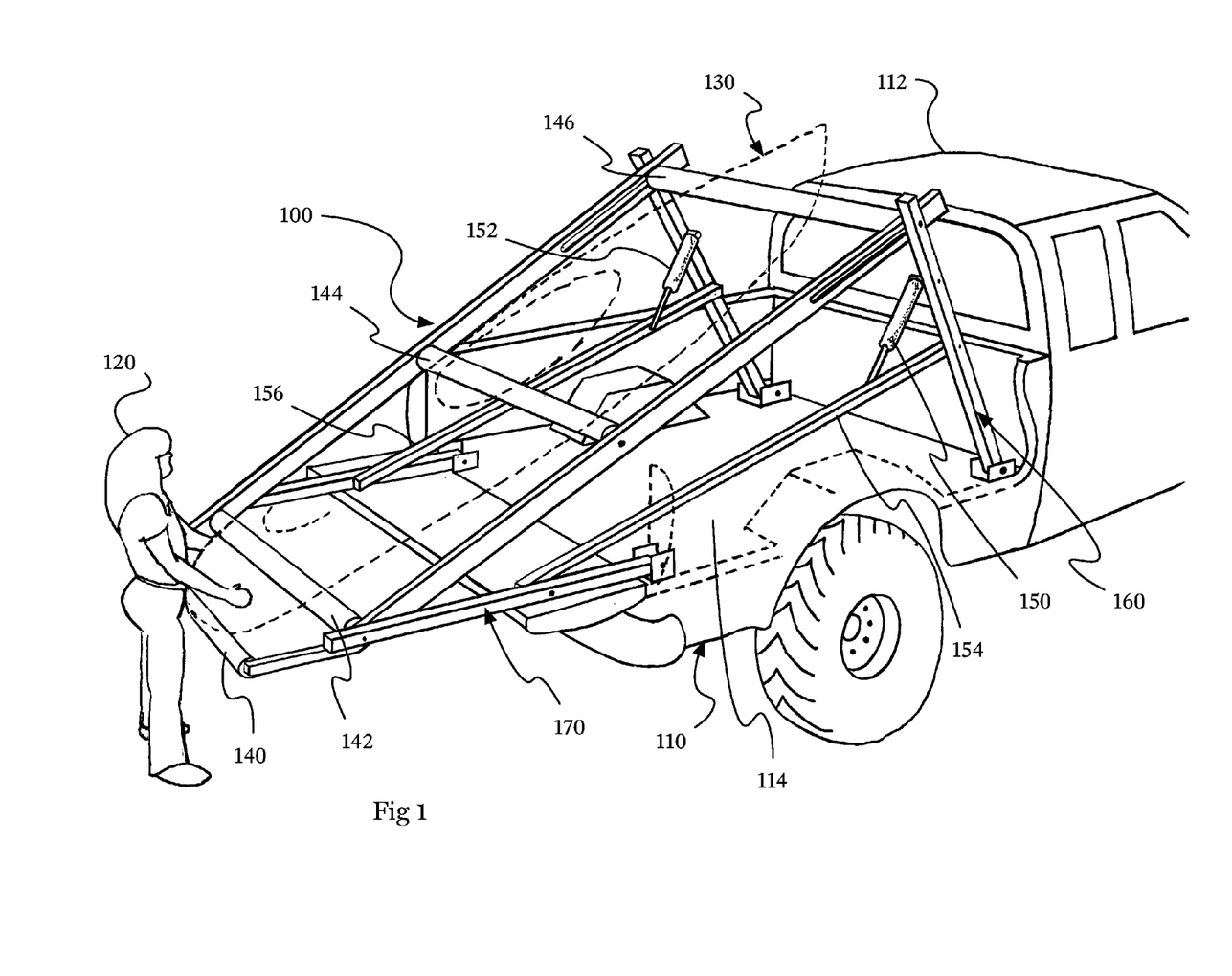
FIG. 1 shows a perspective view that illustrates the cargo carrier attached to the cargo area of a passenger truck with a person loading a kayak onto the cargo carrier.
Figure 5:
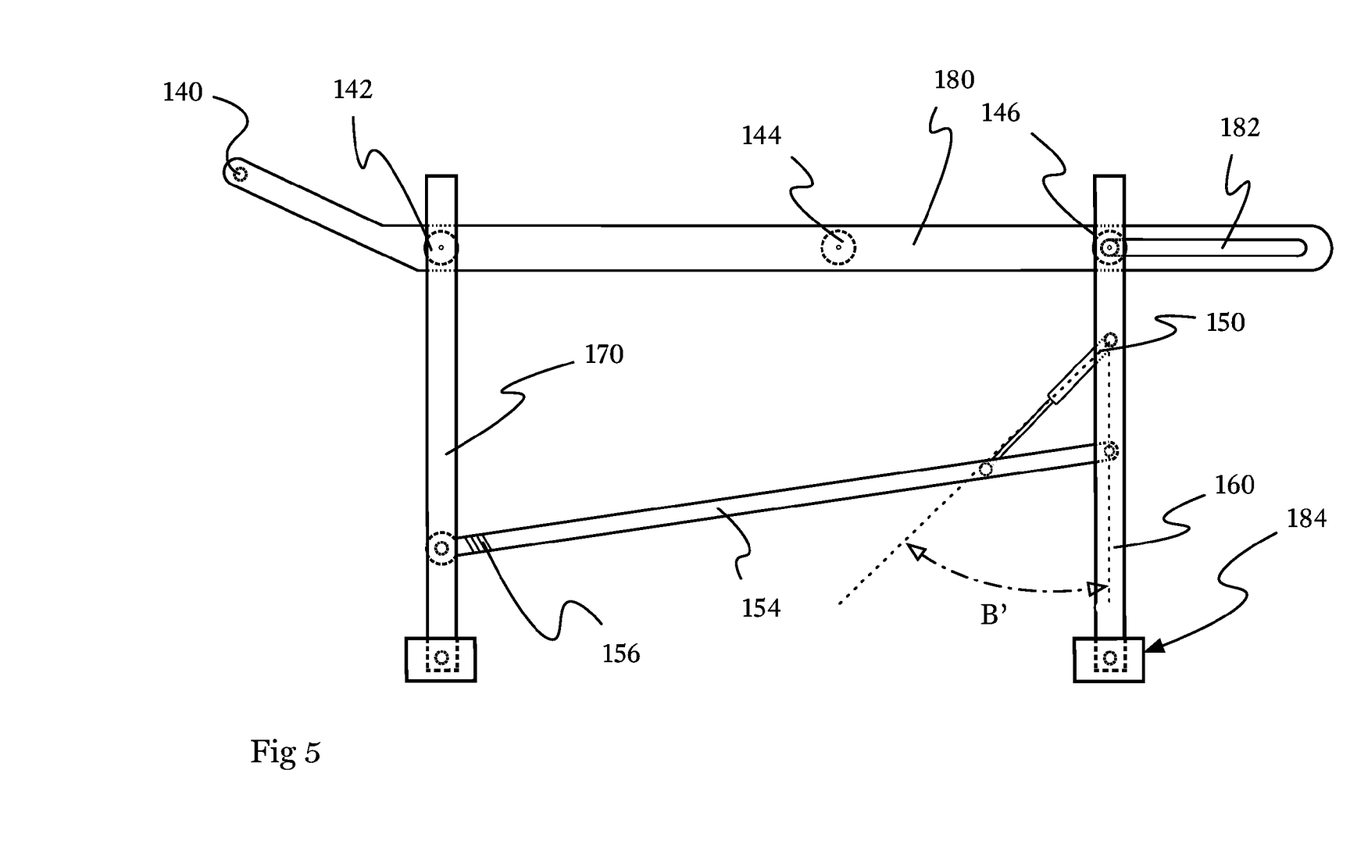
FIG. 5 shows a cut-away, side view that illustrates the cargo carrier in the upright stowage position from the plane formed by line A' of FIG. 4 as viewed toward the side of the cargo carrier.
Figure 6:
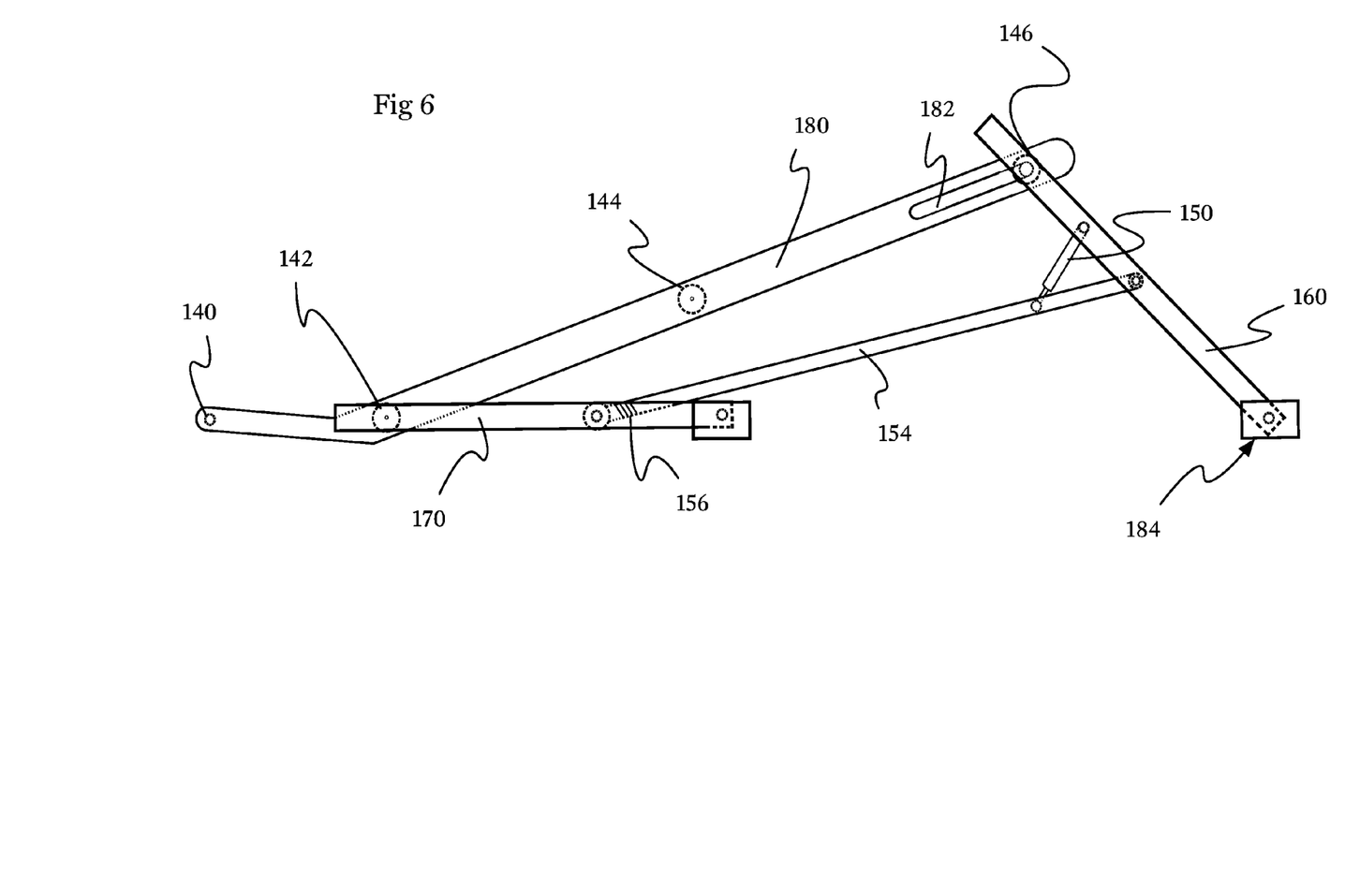
FIG. 6 shows cut away, side view of FIG. 5 that illustrates the cargo carrier in the downward loading position.

FIG. 1 shows a perspective view that illustrates the cargo carrier 100 attached to the truck bed 114 (cargo area) of a passenger truck 110 with a person 120 loading a kayak 130 (cargo) onto the cargo carrier 100. Truck 110 is shown with a portion of the truck bed 114 cut away to reveal the entire cargo carrier 100. The illustrated arrangement of the cargo carrier 100 minimizes the strain of lifting, further, it eliminates overhead lifting. This reduces the difficulty of loading and unloading. This increases safety and efficiency. This is accomplished by reducing the lift height to around the level of the tail gate or the level of the truck bed, as shown. It is further accomplished by a mechanical advantage and force facilitator to move between the loading and stowage position (as shown in FIGS. 5 & 6).

To load the cargo carrier 110, person 120 lifts the kayak 130 up to the rear roller 140. Then, person 120 rolls the kayak 130 forward to the rear-frame roller 142 and settles the kayak 130 upon it. Person 120 continues to roll the kayak 130 forward and onto the carrier to angle it upon the middle roller 144. After the kayak 130 is rolled over the forward-frame roller 146, the kayak will be pushed past the rear roller 140. Rear roller 140 may be positioned above the plane formed by rollers 142, 144, and 146, so that when kayak 140 rolls back, it is stopped by rear roller 140. Said another way, rear roller 140 may also retain the cargo/load while strapping, bunging or other wise securing the cargo/load to the cargo carrier 100. Also, any of the rollers can be used as a fulcrum to assist angling and loading the kayak 130 or any other long or bulk load. This allows the weight of the cargo being loaded to assist in obtain the necessary angle to avoid the passenger cabin.

Figure 2:
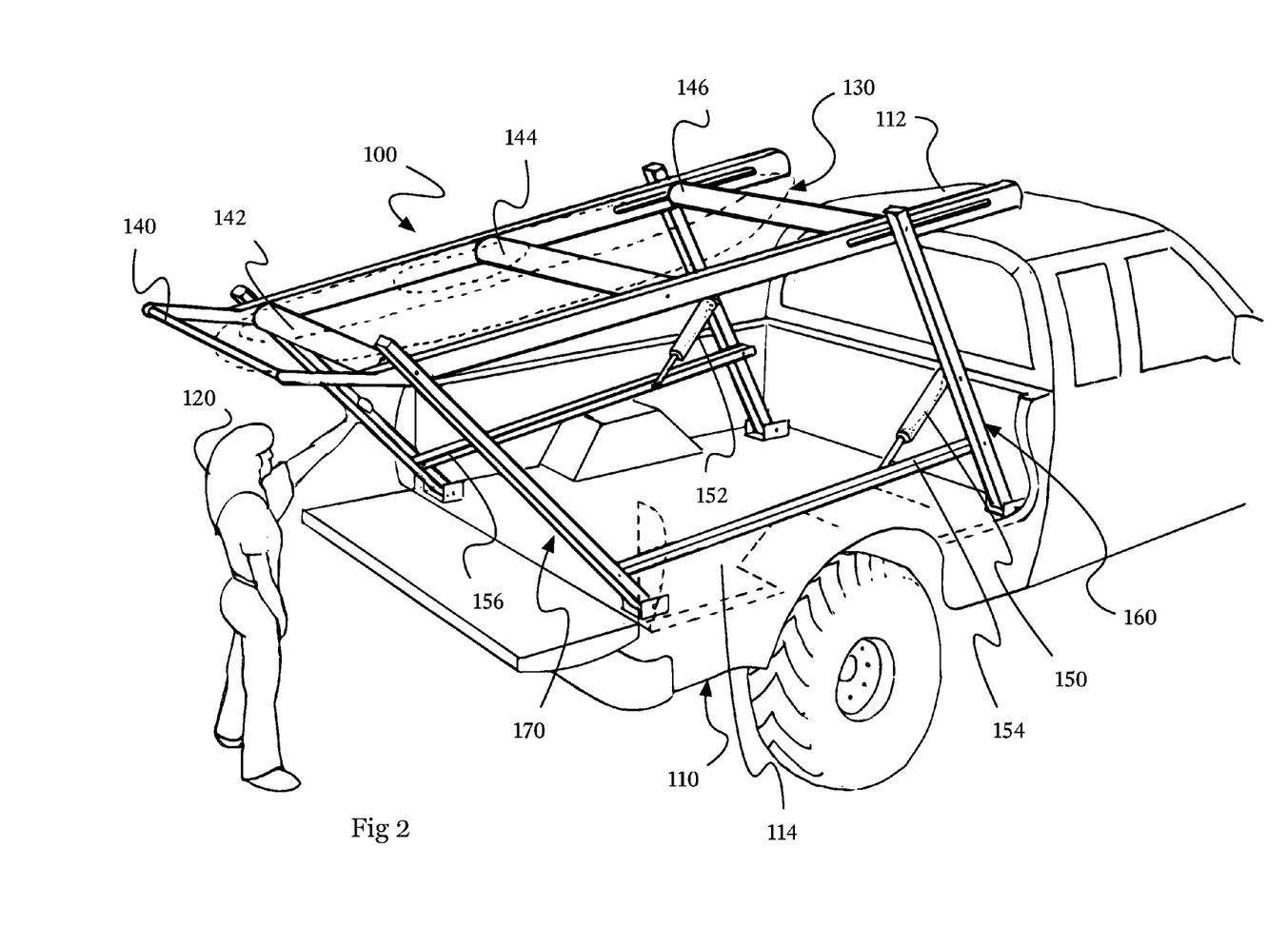
FIG. 2 shows a perspective view that illustrates the person moving the cargo carrier from the loading position to the stowage position with assistance from the piston and mechanical advantage member arrangement between the forward frame and the rear frame.

FIG. 2 shows a perspective view that illustrates the person 120 moving the cargo carrier 100 from the loading position to the stowage position with assistance from the arrangement of the pistons 150 & 152 and the mechanical advantage members 154 & 156 between the forward frame 160 and the rear frame 170. Person 120 moves the cargo carrier 100 between the loading and stowage position by simply rotating up the rear frame 170, which pushes up the forward frame 160 using the mechanical advantage members 154 and 156, as shown.

Pistons 150 & 152 provide force facilitation to move the cargo carrier 100 between the downward loading position and upward stowage position. When in the downward loading position, pistons 150 & 152 store energy that is released when moving to the upward stowage position. When tilting down from the upward stowage position, pistons 150 & 152 resist the downward motion to store energy. This prevents undesirable rapid or uncontrolled descent.

The mechanical advantage members 154 & 156 connect the forward frame 160 and the rear frame 170, as shown. The mechanical advantage members 154 & 156 are connected to allow both the forward frame 160 and the rear frame 170 to be substantially upright when in the stowage position (see FIG. 3). The mechanical advantage members 154 & 156 are connected to allow the rear frame 170 to be substantially horizontal when in the loading position and the forward frame 160 to be at an angle that allows loading of the cargo to avoid the passenger cabin 112 by angling the cargo upward (see FIG. 1). This arrangement provides a mechanical advantage because the forward frame rotates at a slower speed compared to the rear frame. In some embodiments, the ratio of rotation is about 2:1. The ratio of rotation would be selected to provide the best mechanical advantage to assist loading and to avoid the passenger cabin 112.

When moving between the stowage and loading positions, rollers 144 & 146 may roll further to accommodate the kayak because of the change in distance between the forward frame and rear frame as the positions change. In some embodiments, fixed rails may be used instead of rollers, and, loading is not impeded by the frictional sliding of the cargo past the rails when moving between positions.

Figure 3:
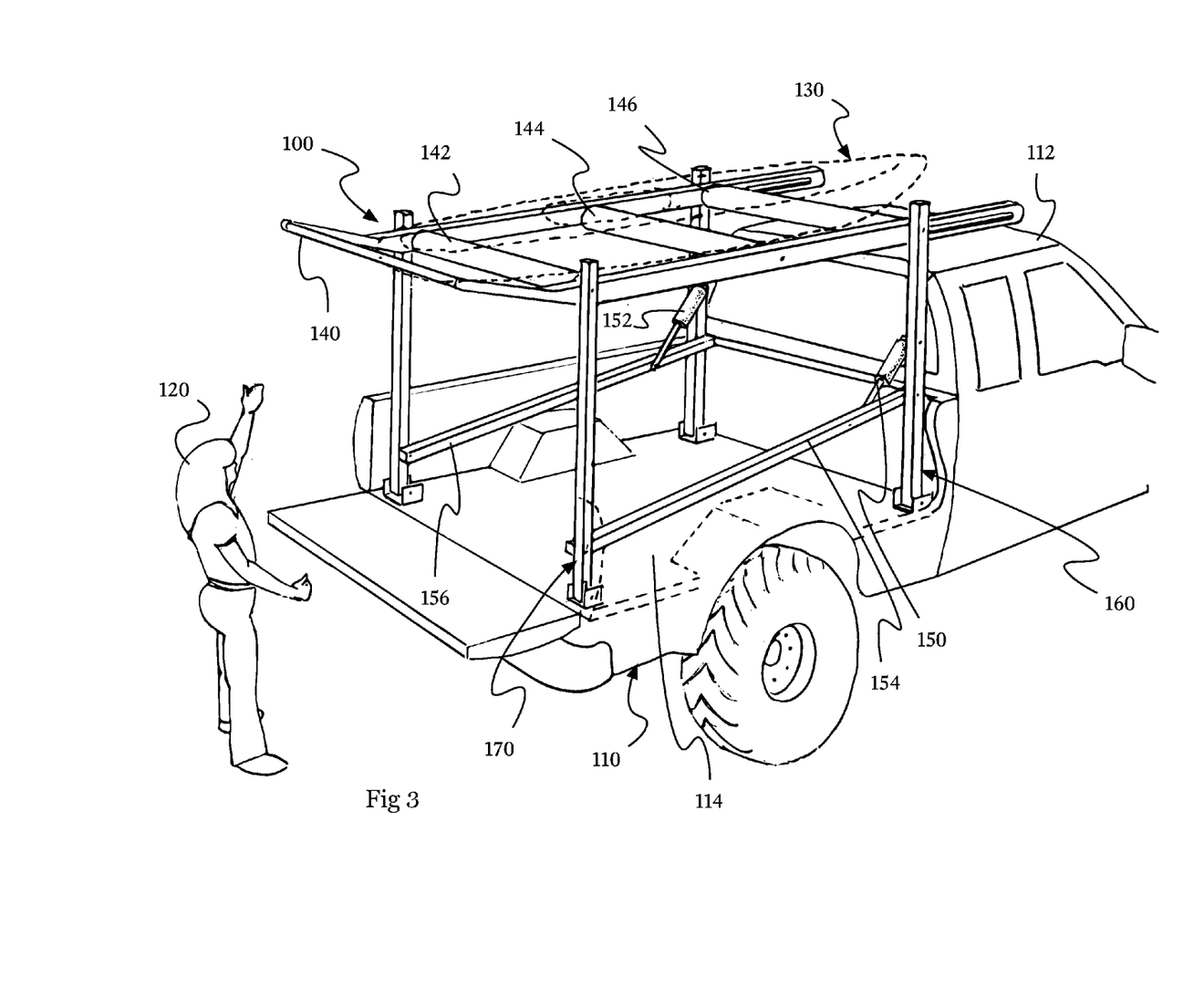
FIG. 3 shows a perspective view that illustrates the cargo carrier locked into the stowage position for hauling with the kayak secured in place.

FIG. 3 shows a perspective view that illustrates the cargo carrier 100 locked into the stowage position for hauling with the kayak 130 secured in place. Cargo carrier 100 may accommodate a wide variety of large, bulky or over-sized cargo, for example, ladders, kayaks, canoes, paragliders, sailboards, surfboards, other water vessels, boards, plywood, pipes, or any other cargo suitable for placement atop a passenger truck. Passenger truck 110 may be any suitable truck that has a passenger cabin (to load above) and truck bed (cargo area), for example, pickup style truck, flatbed style truck, lifted trucks, oversized trucks, short bed trucks, long bed trucks, truck with bed-mounted side tool boxes, truck with bed-mounted front toolboxes, etc.

The kayak 130 can be secured to the cargo carrier in either the stowage position or the loading position, as desired. To secure, person 120 could simply toss a cord-style fastener over the kayak 130, and hook/secure the cord ends into the front frame 160 or rear frame 170. Securing cargo can be accomplished by any means, for example, straps, bungee cords, tie downs, rope, ratcheting straps, adjustable straps, or any other method of securing cargo. In some embodiments, the cargo carrier may be adapted to secure a particular kind of load, such as ladders, canoes, poles, boards, etc, for example, by using purpose built fasteners.

Figure 4:
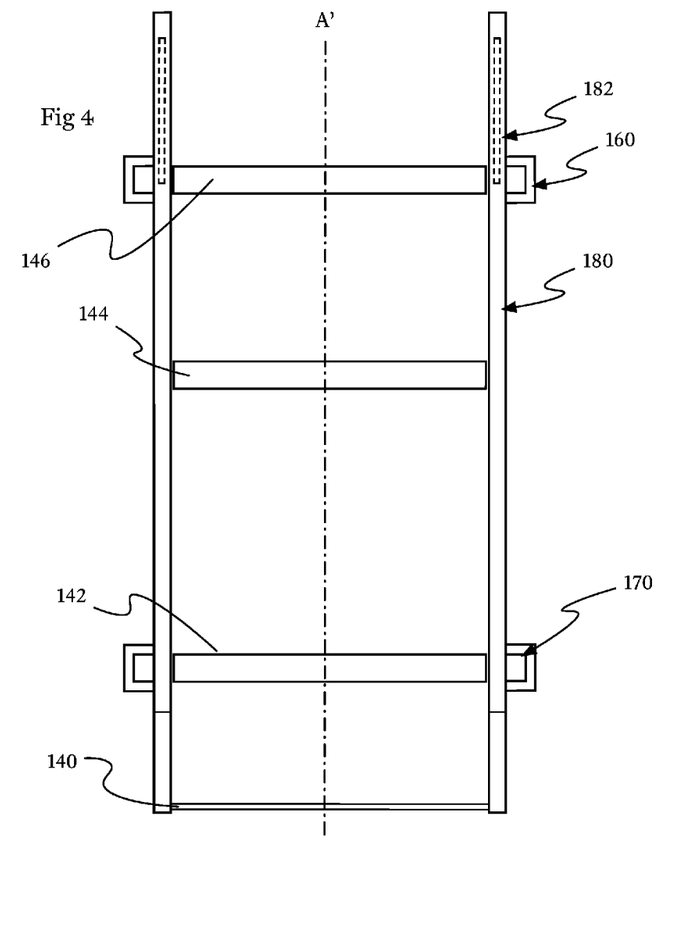
FIG. 4 shows a top view that illustrates the cargo carrier in the upright stowage position.

FIG. 4 shows a top view that illustrates the cargo carrier 100 in the stowage position. All rollers 140, 142, 144, & 146, rotate about an axis to permit rolling of cargo onto and off of the carrier. All rollers 140, 142, 144 & 146 may be padded. Forward-frame roller 146 is attached directly to the forward frame 170. Rear-frame roller 142 is directly attached to the rear frame 170. These rollers are kinds of rails which have an axis with the roller positioned thereon to rotate around the long axis of the rail to allow rolling cargo onto and off of the system. In some embodiments, rails may not include rollers.

Middle roller support 180 is pivotally joined to rear support 170 and pivotally, slide-ably joined to forward support 160, by means of slot 182, as shown. Roller supports 180 positions middle roller 144 between forward roller 146 and rear roller 142 in the same plane.

Rear roller 140 is joined to the roller supports 180. Rear roller 140 is positioned above the plane formed by rollers 142, 144, & 146. This allows cargo to be positioned in front of the rear roller 140 to stop rearward movement of the cargo. See also FIGS. 5 & 6. In some embodiments, rear roller 140 is positioned about 18" behind rear-framer roller 142. This 18" segment of the roller support member is designed to be in (rest in) the horizontal position (parallel with the roadway) when in the downward, loading position.

FIG. 5 shows a cut-away, side view that illustrates the cargo carrier in the upright stowage position from the plane formed by line A' of FIG. 4 as viewed toward the side of the cargo carrier. FIG. 6 shows the cargo carrier of FIG. 5 in the loading position. Considering these views together, they show the arrangement of the mechanical advantage member 154 and the piston 150 to provide force facilitation and mechanical advantage to the forward frame 160 and rear frame 170. The forward frame is attached near a passenger compartment of the passenger truck, and the rearward frame is attached near a lift gate of the passenger truck.

In particular, it can be seen that the attachment of the mechanical advantage member 154 is positioned to provide more rotation to the rear frame 170 than the forward frame 160.

This arrangement further shows the relationship between the frames and the mechanical advantage member that allows the rearward frame to tilt (pivot) faster than the forward frame when moving between the positions. In some embodiments, the forward frame, the rearward frame, and the mechanical-advantage member about double the rotation of the rearward frame compared to the forward frame when moving between the positions.

Further, it can be seen that the frames consist of a rail and two supports that allow the rail to carry the cargo above the passenger compartment when the system is in the stowage position and further permit loading of the cargo area with the system in the stowage position. The rail may comprise two nubs and a roller to allow rolling of cargo onto and off of the system. (See also FIG. 8 and supporting text near 284).

Said another way the forward frame, the rearward frame, and the mechanical-advantage member allow cargo to load by angling above the passenger compartment when the system is in the loading position. That is, they allow cargo to avoid striking the passenger compartment when loading on the angle formed between the rails of forward frame and the rearward frame when in the loading position.

Angle B' is shown between the forward frame 170 and piston 150. In some embodiments, the angle is about 45 degrees. The angle is selected to provide an appropriate amount of force facilitation when moving between the stowage and loading positions; the angle is selected to provide smooth movement while providing sufficient force assistance moving up and force resistance moving down. In one embodiment, a compression style nitrogen gas spring is mounted at about a 45 degree angle to provide an effective operating load weight of no more than a few pounds of force to move the cargo carrier between positions. In other embodiments, a tension gas spring cylinder may be used between the rear frame and the mechanical advantage member.

The piston is attached to the forward frame and attached to the mechanical-advantage member, to resist moving from the stowage position to the loading position and to assist moving from the loading position to the stowage position. The piston could be attached in other locations between the frames. The piston could be any type of force facilitator, for example, a spring, a piston, a piston a having a compress nitrogen gas spring, a tension gas spring cylinder, a linear actuator, etc.

Mechanical advantage member 154 may include an adjustable heim joint 156, as shown. The cargo carrier can easily collapse into the truck bed for temporary storage by removing or disconnecting the mechanical advantage member 154 from either frame 160 or 170, for example, by a quick disconnect linkage.

Either the forward frame 160 or the rear frame 170 may include a latching mechanism to secure and lock the cargo carrier when it is in the upright position. The latching mechanism may be spring loaded to ensure positive latching and secure closure with a corresponding latch mechanism strike pin. Also, the cargo carrier 100 may include bump stops to prevent the forward or rearward frames 160 & 170 from directly contacting the truck's surfaces to ensure quiet operation and to avoid scratching or marring the painted finish.

Feet 184 are attached to the cargo area or truck bed 114, for example, by bolting to the truck bed. Feet 184 are pivotally connected to the frames 160 & 170, for example, by pivot bushings. The cargo carrier 100 can be removed from the passenger truck 112 by detaching the feet 180 from the cargo area 114.

Figure 7:
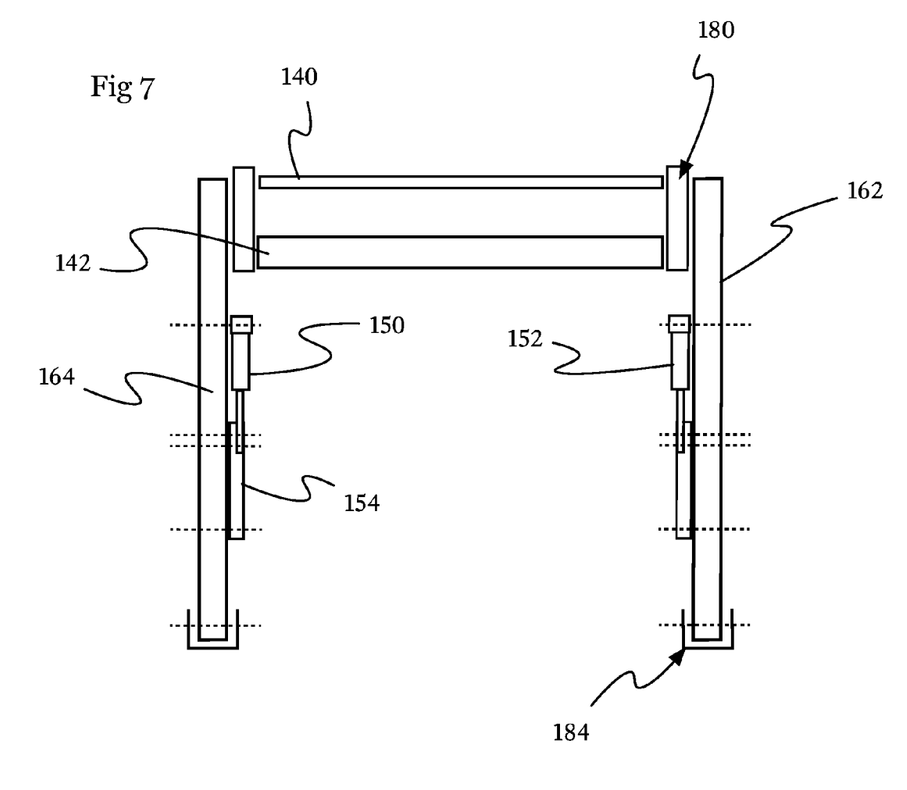
FIG. 7 shows a rear view that illustrates the cargo carrier in the upright stowage position.

FIG. 7 shows a rear view that illustrates the cargo carrier in the upright stowage position. Rear frame 160 and forward frame 170 bear the load of the cargo. Rear frame is shown as two vertical supporting members 162 & 164. Rear-frame roller 142 attaches to axially aligned stubs at the top of each vertical supporting member 162 & 164 to create an axis of rotation.

In other embodiments, the shape of the vertical supporting member may be modified to provide style or function. For example, the shape of the vertical supporting member may be selected to contour with the shape of the passenger cabin, to provide a streamlined style. For further example, the shape of the vertical supporting member may be selected to avoid tool boxes mounted in the cargo area.

Roller 142 may be sized for the width of a particular truck. Different widths of truck beds may simply use longer or shorter rollers, as appropriate.

Figure 8:
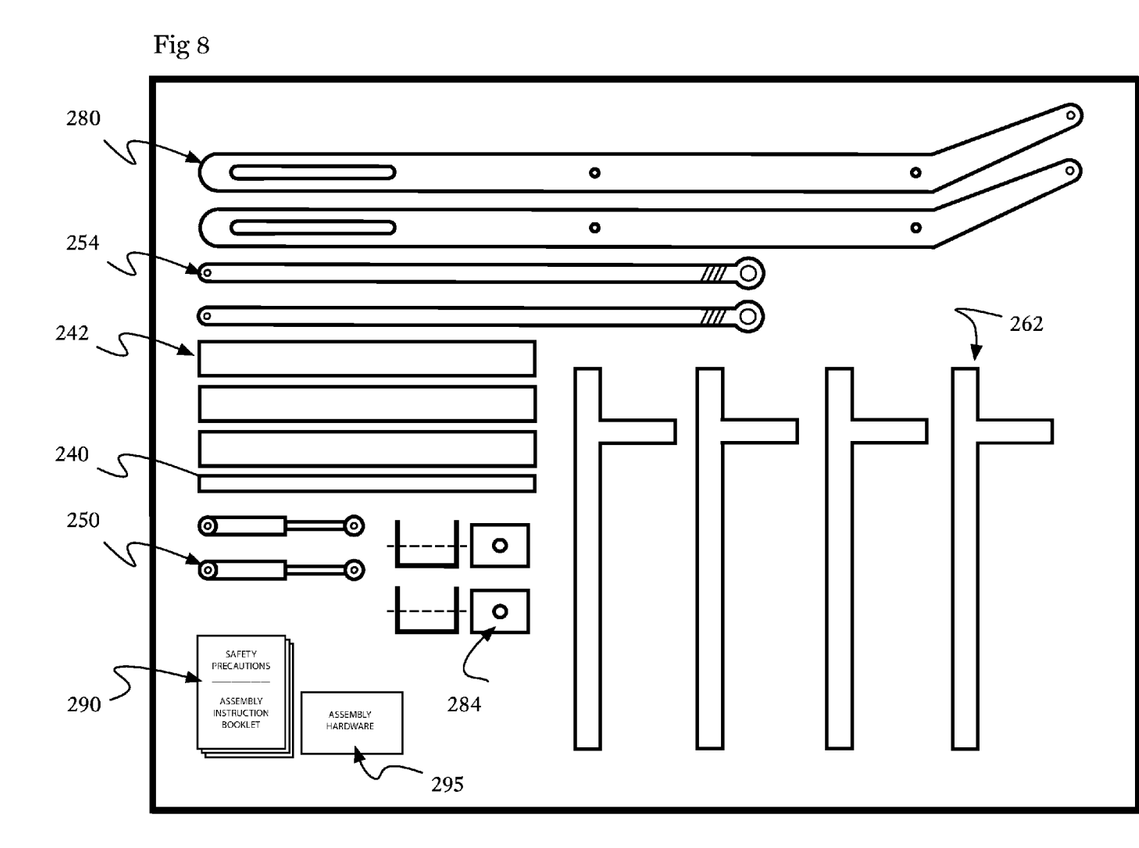
FIG. 8 shows a diagrammatic view that illustrates a shipping container holding the disassembled cargo carrier suitable for after-market installation.

FIG. 8 shows a diagrammatic view that illustrates a shipping container holding the disassembled cargo carrier suitable for after-market installation.

Shipping container 200 contains all the parts and fasteners to assemble the cargo carrier 100. The shipping container includes:
a) four (4) vertical supporting member 262;
b) three (3) rollers 242;
c) one (1) rear roller 240;
d) two (2) pistons 250;
e) four (4) feet 284;
f) two (2) mechanical advantage members with adjustable heim joints 254;
g) two (2) roller support member 280;
h) assembly instructions 290; and
i) linkages, fasteners, bumpers and latches & pins 295.

Vertical supporting members 262 may be fully interchangeable between all four positions, allowing easy installation. Rollers 242 may come pre-sized for a specific truck bed width, or, alternately, they may be sizable (by cutting). Rollers 242 may be sized at about 3". Two vertical supporting members 262 and one roller 240 may be assembled into a frame.

Rollers 242 may include weather resistant grip padding covering. The various members may be made of aluminum or steel tubing, either round or square. Square tubing may better resist torsional forces without concern for shear resistant fasteners. Feet may be milled aluminum or manufactured from steel plate.

Members may have holes or other accouterments to allow positions for straps, bungees or tie downs.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

I claim:

1. A system to load cargo atop of a passenger truck comprising:
   a forward frame and a rearward frame, pivotally attached to the cargo area of the passenger truck to allow pivoting between an upright stowage position and a downward loading position, with the forward frame attached near a passenger compartment of the passenger truck, and with the rearward frame attached near a rear portion of the cargo area of the passenger truck;
   a mechanical-advantage member, positioned between the forward frame and the rearward frame, to tilt the rearward frame faster than the forward frame when moving between the positions;
   wherein each of the frames comprises a rail and two supports that are structured and arranged to allow the rail to carry the cargo above the passenger compartment when the system is in the stowage position and further structured and arranged to permit loading of the cargo area with the system in the stowage position.

2. The system of claim 1 wherein:
   the forward frame, the rearward frame, and the mechanical-advantage member are structured and arranged to allow cargo to load by angling above the passenger compartment when the system is in the loading position.

3. The system of claim 1 wherein:
   the forward frame, the rearward frame, and the mechanical-advantage member are structured and arranged to allow cargo to avoid the passenger compartment when loading on the angle formed between the rails of forward frame and the rearward frame when in the loading position.

4. The system of claim 1 wherein:
   the forward frame, the rearward frame, and the mechanical-advantage member are structured and arranged to about double the rotation of the rearward frame compared to the forward frame when moving between the positions.

5. The system of claim 1 further comprising:
   a force facilitator, attached to the forward frame and attached to the mechanical-advantage member, to resist moving from the stowage position to the loading position and assist moving from the loading position to the stowage position.

6. The system of claim 1 further comprising:
   a force facilitator, connected between the forward frame and rearward frame to resist moving from the stowage position to the loading position and to assist moving from the loading position to the stowage position.

7. The system of claim 6 wherein:
   the force facilitator is a spring.

8. The system of claim 6 wherein:
   the force facilitator is a linear actuator.

9. The system of claim 6 wherein:
   the force facilitator is a piston.

10. The system of claim 6 wherein:
    the force facilitator is a piston having a gas nitrogen spring.

11. The system of claim 1 wherein the rail comprises:
an axis, having a roller positioned thereon, to rotate around the long axis of the rail of the frame to allow rolling cargo onto and off of the system.

12. The system of claim 11 further comprising:
a middle roller, positioned between the two rollers and connected to the frames, to allow rolling cargo onto and off of the system.

13. The system of claim 11 further comprising:
a force facilitator, connected between the forward frame and the rearward frame to resist moving from the stowage position to the loading position and to assist moving from the loading position to the stowage position;
wherein the forward frame, the rearward frame, and the mechanical-advantage member are structured and arranged to about double the rotation of the rearward frame compared to the forward frame when moving between the positions;
wherein the forward frame, the rearward frame, and the mechanical-advantage member are structured and arranged to allow cargo to avoid the passenger compartment when loading on the angle formed between the rails of forward frame and the rearward frame when in the loading position.

14. The system of claim 13 further comprising:
a middle roller, positioned between the two rollers and connected to the frames, to allow rolling cargo onto and off of the system;
wherein the force facilitator is a piston.

15. The system of claim 1 further comprising:
a rear roller, connected to the rearward frame, positioned behind the two rollers, to allow rolling cargo onto and off of the system;
wherein the rear roller is further positioned above the plane formed the two rollers to stop rearward rolling of the cargo that rests on the plane formed by the two rollers.

16. The system of claim 15 further comprising:
a force facilitator, connected between the forward frame and rearward frame to resist moving from the stowage position to the loading position and to assist moving from the loading position to the stowage position;
wherein the forward frame, the rearward frame, and the mechanical-advantage member are structured and arranged to about double the rotation of the rearward frame compared to the forward frame when moving between the positions;
wherein the forward frame, the rearward frame, and the mechanical-advantage member are structured and arranged to allow cargo to avoid the passenger compartment when loading on the angle formed between the rails of forward frame and the rearward frame when in the loading position.

17. The system of claim 15 further comprising:
a middle roller, positioned between the two rollers and connected to the frames, to allow rolling cargo onto and off of the system.

18. The system of claim 17 wherein the rail comprises:
an axis, having a roller positioned thereon, to rotate around the long axis of the rail of the frame to allow rolling cargo onto and off of the system.

19. A kit, which retrofits a passenger truck with a passenger cabin and a cargo area, comprising:
four frame supports;
two frame rollers;
two mechanical-advantage members; and
four pivoting feet;
wherein the frame supports and the rollers assemble into a forward frame and a rearward frame;
wherein the above parts assemble to build a system comprising
a forward frame and a rearward frame, pivotally attached to the feet, which are attached to the passenger truck, to allow pivoting between an upright stowage position and a downward loading position, with forward frame attached near a passenger compartment of the passenger truck, and with the rearward frame attached near a lift gate of the passenger truck;
a mechanical-advantage member, positioned between the forward frame and the rearward frame, to tilt the rearward frame faster than the forward frame when moving between the positions;
wherein each of the frames is structured and arranged to allow the roller to allow rolling cargo onto and off of the system, is further structured and arranged to carry the cargo above the passenger compartment when the system is in the stowage position and yet further structured and arranged to permit loading of the cargo area with the system in the stowage position.

20. The kit of claim 19 further comprising:
a middle roller; and
two roller supports;
wherein the middle roller is rotatingly attached to the two roller supports; and
wherein the two roller supports are connected to the frames;
whereby allowing cargo to roll onto and off of the system.

21. The kit of claim 19 further comprising:
a rear roller; and
two roller supports;
wherein the rear roller is rotatingly attached to the two roller supports behind the other rollers; and
wherein the rear roller is further positioned above the plane formed the other rollers to stop rearward rolling of the cargo that rests on the plane formed by the other rollers.

22. The kit of claim 19 further comprising:
two force facilitators;
wherein the force facilitator, connected between the forward frame and rearward frame to resist moving from the stowage position to the loading position and to assist moving from the loading position to the stowage position.

23. The kit of claim 22 further comprising:
a middle roller; and
two roller supports;
wherein the middle roller is rotatingly attached to the two roller supports; and
wherein the two roller supports are connected to the frames;
whereby allowing cargo to roll onto and off of the system.

24. The kit of claim 22 further comprising:
a rear roller; and
two roller supports;
wherein the rear roller is rotatingly attached to the two roller supports behind the other rollers; and
wherein the rear roller is further positioned above the plane formed the other rollers to stop rearward rolling of the cargo that rests on the plane formed by the other rollers.

25. The kit of claim 24 further comprising:
a middle roller; and
two roller supports;
wherein the middle roller is rotatingly attached to the two roller supports; and wherein the two roller supports are connected to the frames;

whereby allowing cargo to roll onto and off of the system.

* * * * *